United States Patent
Kazimi et al.

(10) Patent No.: US 6,311,929 B1
(45) Date of Patent: Nov. 6, 2001

(54) SPACECRAFT AND APPENDAGE STEPPING METHODS THAT IMPROVE SPACECRAFT ATTITUDE POINTING AND CANCEL SOLAR ARRAY SLEW DISTURBANCES

(75) Inventors: Fatima Kazimi, Santa Cruz; Keith Reckdahl, Palo Alto; Tung Liu, Union City; Yat Fai Leung, Redwood City; John Higham, Mountain View, all of CA (US)

(73) Assignee: Space Systems/Loral, Inc., Palo Alto, CA (US)

( * ) Notice: Subject to any disclaimer, the term of this patent is extended or adjusted under 35 U.S.C. 154(b) by 0 days.

(21) Appl. No.: 09/449,404

(22) Filed: Nov. 26, 1999

(51) Int. Cl.[7] ............................ B64G 1/00; B64G 1/24
(52) U.S. Cl. ............... 244/158 R; 244/171; 244/173; 244/164
(58) Field of Search ....................... 244/164, 168, 244/171, 173, 169, 166, 158 R; 364/724.07

(56) References Cited

U.S. PATENT DOCUMENTS

| | | | |
|---|---|---|---|
| 4,834,294 | 5/1989 | Bhat et al. | 318/696 |
| 5,540,405 | * 7/1996 | Bender et al. | 244/166 |
| 5,610,848 | * 3/1997 | Fowell | 364/724.07 |
| 5,687,933 | * 11/1997 | Goodzeit et al. | 244/169 |
| 5,697,582 | * 12/1997 | Surauer | 244/168 |
| 5,816,540 | * 10/1998 | Murphy et al. | 244/173 |

* cited by examiner

Primary Examiner—Charles T. Jordan
Assistant Examiner—George L. Steele
(74) Attorney, Agent, or Firm—Anthony W. Karambelas

(57) ABSTRACT

A spacecraft having a body, one or more appendages coupled thereto, and a controller that implements methods that rotate the one or more flexible appendages to point it (them) towards the Sun to reduce spacecraft attitude pointing disturbances and improves spacecraft attitude pointing. The steps of the one or more appendages are timed to deadbeat the disturbance imparted to the spacecraft body. Timing of the appendage steps may be such that the periodic disturbances are phased to substantially cancel each other, or phased to decrease the magnitude of the net disturbance. The present invention also cancels solar array slew disturbances. The present invention cancels predictable disturbance torques before they produce a pointing error, improving the spacecraft pointing performance. The present invention predicts a disturbance torque exerted on the body due to the controller moving the one or more appendages, calculates a feedforward torque necessary for the controller to cancel the disturbance torque and includes the feedforward torque in the calculation of the total control torque applied to the body.

10 Claims, 1 Drawing Sheet

Fig. 1
(PRIOR ART)
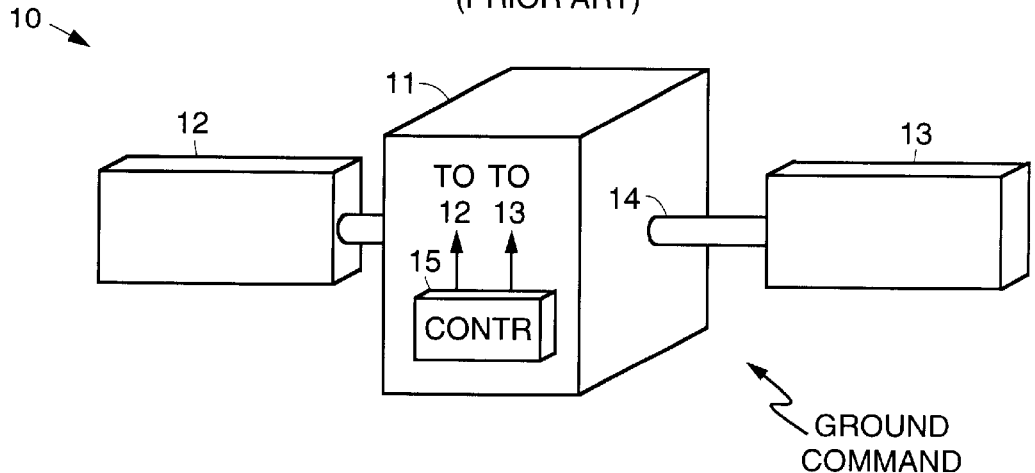
Fig. 2
ROTATING (STEPPING) THE NORTH AND SOUTH SOLAR ARRAY WINGS AT A RATE REQUIRED FOR SUN TRACKING, AND WHEREIN THE PERIOD OR INTERVAL BETWEEN THE NORTH AND THE SOUTH WING STEPS IS SELECTED TO DEADBEAT THE DISTURBANCE IMPARTED TO THE SPACECRAFT BODY BY THE NORTH AND SOUTH SOLAR ARRAY WINGS
Fig. 3
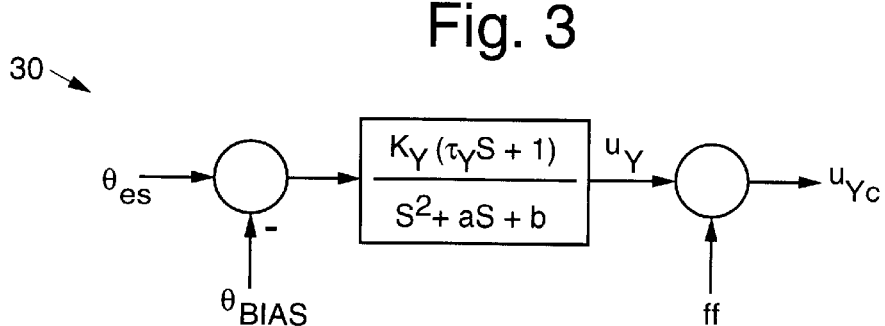

SPACECRAFT AND APPENDAGE STEPPING METHODS THAT IMPROVE SPACECRAFT ATTITUDE POINTING AND CANCEL SOLAR ARRAY SLEW DISTURBANCES

BACKGROUND

The present invention relates generally to spacecraft attitude pointing methods, and more particularly, to spacecraft attitude pointing methods that provide for stepping multiple appendages to reduce spacecraft attitude pointing disturbances caused by appendage stepping and cancellation of solar array slew disturbances.

A class of spacecraft known as three-axis stabilized spacecraft employ a solar array to generate power for the spacecraft. The solar array must be maintained in a position normal to the sun to absorb the optimum amount of radiation. Because the solar array is maintained normal to the sun, a servo controlled stepping mechanism, such as a stepping motor and an appropriate gear train, is typically employed to cause the solar array to track the sun while the spacecraft is in constant rotation relative to the sun in an orbit about the earth. Other types of attitude control mechanisms, such as dc motors, prove to be relatively difficult to control and are heavy. However, in theory, servo controlled dc motors would not generate oscillation. It is desirable to use stepper motors because stepper motors are relatively simple to control, reliable, lightweight and well adapted to continuous use.

One of the major problems with the use of stepping motors is that the stepping action can excite a highly flexible array such that oscillation is induced within the spacecraft. The induced oscillation is particularly critical in spacecraft where absolute platform stability is desirable or required, such as platforms for high resolution optical imaging systems. Vibrations can cause deterioration of any inertia-sensitive operations of a spacecraft. Therefore, it is desirable to solve the problem of induced oscillation caused by a stepper motor.

U.S. Pat. No. 4,843,294 entitled "Solar Array Stepping to Minimize Array Excitation" assigned to the assignee of the present invention discloses one way to improve spacecraft attitude pointing. The method disclosed in U.S. Pat. No. 4,843,294 deadbeats individual appendage oscillations. As such, the stepping of the solar array wings were stepped in a manner that minimized their individual oscillations. The present invention improves upon the teachings of U.S. Pat. No. 4,843,294.

More particularly, and in accordance with the teachings of U.S. Pat. No. 4,843,294, mechanical oscillations of a mechanism containing a stepper motor, such as a solar-array powered spacecraft, are reduced and minimized by the execution of step movements in pairs of steps. The period between steps is equal to one-half of the period of torsional oscillation of the mechanism. Each pair of steps is repeated at needed intervals to maintain desired continuous movement of the portion of elements to be moved, such as the solar array of a spacecraft. In order to account for uncertainty as well as slow change in the period of torsional oscillation, a command unit may be provided for varying the interval between steps in a pair.

Furthermore, solar arrays are Sun tracking, while satellite payloads are Earth tracking. This means the solar arrays rotate with respect to the body of the spacecraft. Every step in the rotation causes a disturbance. As solar arrays become physically larger, so do the disturbances caused by rotation the solar arrays. Previous systems developed by the assignee of the present invention relied entirely on feedback to reduce the disturbances. The present invention takes apriori knowledge of an event (solar array step) and uses that knowledge to reduce the disturbance.

Accordingly, it is an objective of the present invention to provide for spacecraft attitude pointing methods that provide for stepping multiple appendages to reduce spacecraft attitude pointing disturbances caused by appendage stepping and cancellation of solar array slew disturbances.

SUMMARY OF THE INVENTION

To accomplish the above and other objectives, the present invention provides for a method of stepping multiple appendages (North and South solar array wings) that reduces spacecraft attitude pointing disturbances caused by appendage stepping and thus improves spacecraft attitude pointing. In contrast to the method disclosed in U.S. Pat. No. 4,843,294, the present invention uses multiple appendages to deadbeat the impact on the spacecraft body oscillation. That is, the system disclosed in U.S. Pat. No. 4,843,294 controls the time between steps of the same appendage, while the present invention controls the time between steps of different appendages. The present invention is advantageous when the same mechanism does not require two successive steps. The present invention provides for a simple method that improves spacecraft attitude pointing if multiple appendages are stepped and which can be optimized easily while in-orbit using ground commands.

The North and South solar array wings are stepped at a rate required for sun tracking. The period between the North and the South wing steps is chosen that deadbeats the flexible appendage disturbance imparted to the spacecraft body by the solar array wings. The deadbeat interval is less than the step rate required for sun tracking. Thus, spacecraft attitude pointing is improved without requiring changes to the sun tracking rate of each individual wing. Also, the timing between the first and second appendage steps may be ground commanded so that uncertainties in the flexible properties of the solar array wings can be optimized easily while the spacecraft is on-orbit.

Thus, the present invention phases the motion of the solar array wings so that the combined effect on the spacecraft body is minimized. Stepping of the motion of one wing is timed with respect to stepping of the second wing so that the spacecraft body oscillations are minimized. The phased motion of the North and South solar array wings combine to minimize the motion of the spacecraft body. Thus, both solar array wings may oscillate but the spacecraft body of the does not. This improves the pointing accuracy (antenna pointing) of the spacecraft.

The present invention also provides for a second method that cancels solar array slew disturbances exerted on the spacecraft body. The second method reduces the magnitude of the disturbance to the spacecraft body, which results in smaller pitch errors.

The second method involves predicting the disturbance torque exerted on the spacecraft due to the stepping of a flexible appendage, and having the spacecraft actuators compensate for the disturbance torque before it creates a pointing error. Since this torque is relatively small, current control systems allow the disturbance torque to produce a pointing error and then cancel the pointing error with feedback control. However this invention cancels the predictable disturbance torque before it produces a pointing error, improving the spacecraft pointing performance.

The term "feedback" means to calculate a control signal by processing sensor data. Conversely, the term "feedforward" means to calculate a control signal without using sensor data. For example, if a body was exposed to a predictable disturbance torque, feedforward control would apply and equal and opposite attitude control torque to cancel the disturbance torque before it created a pointing error. Feedforward control is not used alone, but rather is used with feedback control in order to make the feedback control more effective.

The present invention may be used with geosynchronous orbit spacecraft having large solar arrays wherein the solar arrays continuously track the sun. The present invention may also be used with apparatus where it is desirable to minimize vibration introduced by stepped excitation.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which:

FIG. 1 illustrates an exemplary spacecraft in which the present methods may be employed;

FIG. 2 illustrates a first exemplary method in accordance with the principles of the present invention for controlling solar array wings to provide for sun tracking and FIG. 3 illustrates a second exemplary method in accordance with the principles of the present invention that cancels solar array slew disturbances.

DETAILED DESCRIPTION

Referring to the drawing figures, FIG. 1 illustrates an exemplary spacecraft 10 in which the present methods may be employed. The spacecraft 10 comprises a body 11 having rotatable North and South solar array wings 12. 13 coupled thereto. A servo controlled stepping mechanisms 14 such as a stepping motor and an appropriate gear train is coupled to the North and South solar array wings 12, 13. A controller (CONTR) 15 is coupled to the servo controlled stepping mechanisms 14 which cooperate to rotate the North and South solar array wings 12, 13 to point them towards the sun. The North and South solar array wings 12, 13 are rotated on a stepwise basis using the controller 14 in a manner provided by the present invention.

In general, the North and South solar array wings 12, 13 are stepped at a rate required for sun tracking. Previous designs developed by the assignee of the present invention have equally spaced the North and South wing steps so that the disturbance to the spacecraft body 11 is equally spaced. However, this does not minimize the disturbance to the spacecraft 10.

The present invention provides for a period between the North and the South wing steps that deadbeats the flexible appendage disturbance imparted to the spacecraft body 11 by the North and South solar array wings 12, 13. The term "deadbeat" as used herein means to make two periodic signals cancel each other by ensuring they have phases 180 degrees apart, which makes the two signals be the negative of each other and causing their sum to go to zero. In practice, such perfect cancellation is not generally possible since the phases and magnitudes will vary slightly. The practical definition of deadbeating is that the two signals substantially cancel each other, decreasing the magnitude of the sum of the two signals. The term "deadbeat interval" refers to the delay between the two signals. The two signals deadbeat each other when their deadbeat interval is half the period of the signals, making the two signals be the negative of each other and making the sum of the two signals be substantially zero.

The present invention causes the deadbeat interval or period to be less than the step rate required for sun tracking. In this way spacecraft attitude pointing is improved without requiring any change to the sun tracking rate of each individual wing 12, 13. In addition, the timing between the first and second appendage steps can be ground commanded so that uncertainties in the flexible properties of the appendages (solar array wings 12, 13) can be optimized easily while the spacecraft 10 is on-orbit.

Referring to FIG. 2, it illustrates details of a first exemplary method 20 in accordance with the principles of the present invention for controlling solar array wings 12, 13 to provide sun tracking. The method 20 is used with a spacecraft 10 having a body 11 with North and South solar array wings 12, 13 coupled thereto by way of servo controlled stepping mechanisms 14, and a controller 15 coupled to the servo controlled stepping mechanisms 14 that is used to rotate the solar array wings 12, 13 to point them towards the sun. The method 20 is as follows.

The method 20 rotates 21 (steps 21) the North and South solar array wings 12, 13 at a rate required for sun tracking, and the period or interval between North and South wing steps is selected to deadbeat the disturbance imparted to the spacecraft body 11 by the North and South solar array wings 12, 13. Thus using the method 20, the steps of the appendages are timed such that the periodic disturbances are phased to substantially cancel each other, or are timed such that the periodic disturbances are phased to decrease the magnitude of the net disturbance.

Referring to FIG. 3, it illustrates a second exemplary method 30 in accordance with the principles of the present invention that cancels solar array stepping disturbances exerted on the spacecraft body 11. The control law reads the current pitch attitude ($\theta_{es}$) from the earth sensor and subtracts a bias ($\theta_{bias}$) where the bias is used to correct for sensor inaccuracies or to achieve non-nadir pointing. This difference, called the error signal, is fed into the pitch compensation filter, the output of which is the feedback torque ($u_Y$). The total control torque ($u_{YC}$) is calculated by adding the feedback torque uY to the feedforward torque (ff), where ff is the negative of the predicted disturbance torque due to solar array stepping. The total control torque ($u_{YC}$) is then sent to the reaction wheels or other actuators, where $u_{YC}$ specifies the total control torque which should be applied to the spacecraft to control pitch pointing. The ff signal may be impulsive, or a signal having a polynomial or Fourier fit based on known flexible body properties of the spacecraft 10.

It is important to note that current control systems simply use the feedback torque $u_Y$ for control, while this invention improves controller performance by adding the feedforward term ff to compensate for disturbance torques due to solar array stepping. At first, it was not believed that it was necessary to include a feedforward term for the solar-array stepping disturbance torque because it is relatively small. However, it was learned that including such a feedforward term not only cancels the disturbance more effectively than feedback control, it also allows the control system to reduce its noise rejection at the solar-array frequency, allowing improved noise rejection at other frequencies.

The controller 14 in FIG. 3 uses the pitch compensation filter $$\frac{K_Y(\tau_Y * S + 1)}{S^2 + a * S + b},$$

where $K_y$, $\tau_Y$, a and b are filter constants which are chosen in the control design process in order make the controller produce the desired feedback response. It is important that this invention is the addition of the feedforward term; this invention can be used with any feedback controller. Therefore, the feedback compensation filter could have a different structure or could have additional sensor inputs or additional outputs such as roll torque or yaw torque. Furthermore, the control law could include other terms such as additional feedfoward torques to compensate for solar torques or a time-varying desired attitude.

The example in FIG. 3 involves controlling the pitch attitude due to solar array stepping. This invention may also be used to step other flexible appendages and may involve other spacecraft axes.

Thus, spacecraft attitude pointing methods that provide for stepping multiple appendages to reduce spacecraft attitude pointing disturbances caused by appendage stepping and cancellation of solar array slew disturbances have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. In a spacecraft having a body with multiple flexible appendages coupled thereto, control apparatus for moving the multiple flexible appendages, and a controller used for controlling the attitude of the body, a method comprising the steps of:

predicting a disturbance torque exerted on the body due to the control apparatus moving the multiple flexible appendages;

calculating a feedforward torque necessary for the controller to cancel the disturbance torque caused by moving the multiple flexible appendages; and including the feedforward torque in the calculation of total control torque applied to the body.

2. The method recited in claim 1 wherein the multiple flexible appendages are solar array wings.

3. The method recited in claim 2 wherein calculation of the total control torque comprises the steps of:

calculating sensor error by subtracting desired sensor output from the sensor output;

using the sensor error as input to an attitude compensation filter, the output of which is the feedback control torque; and calculating the total control torque by adding the feedforward torque to the feedback control torque.

4. The method recited in claim 2 wherein the feedfoward torque is impulsive.

5. The method recited in claim 2 wherein the feedfoward torque is modeled by a polynomial fit based on the known flexible body properties of the spacecraft.

6. The method recited in claim 2 wherein the feedfoward torque is modeled by a Fourier fit based on known flexible body properties of the spacecraft.

7. A spacecraft comprising:

a body;

multiple flexible appendages coupled to the body that impart a periodic disturbance on the body when the multiple flexible appendages are stepped; and a controller coupled to the multiple flexible appendages that times the steps of the multiple flexible appendages to deadbeat the disturbance imparted to the spacecraft body, which controller predicts a disturbance torque exerted on the body due to the controller moving the multiple flexible appendages, calculates a feedforward torque necessary for the controller to cancel the disturbance torque caused by moving the multiple flexible appendages, and includes the feedforward torque in the calculation of the total control torque applied to the body.

8. The spacecraft recited in claim 7 wherein the controller times the steps of the multiple flexible appendages such that the periodic disturbances are phased to substantially cancel each other.

9. The spacecraft recited in claim 7 wherein the controller times the steps of the multiple flexible appendages such that the periodic disturbances are phased to decrease the magnitude of the net disturbance.

10. The spacecraft recited in claim 7 wherein the controller calculates the total control torque by:

calculating a sensor error by subtracting a desired sensor output from the sensor output;

using the sensor error as input to an attitude compensation filter, the output of which is the feedback control torque; and calculating the total control torque by adding the feedforward torque to the feedback control torque.

* * * * *